United States Patent
Zaidi

(10) Patent No.: US 6,237,088 B1
(45) Date of Patent: *May 22, 2001

(54) SYSTEM AND METHOD FOR TRACKING IN-FLIGHT INSTRUCTIONS IN A PIPELINE

(75) Inventor: Nazar A. Zaidi, San Jose, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/089,736

(22) Filed: Jun. 3, 1998

(51) Int. Cl.[7] .................................................. G06F 9/42
(52) U.S. Cl. ............................................................ 712/239
(58) Field of Search ...................................... 712/237, 239

(56) References Cited

U.S. PATENT DOCUMENTS

| 5,265,213 | * | 11/1993 | Welser et al. | 712/240 |
| 5,692,167 | * | 11/1997 | Grodhowski et al. | 712/226 |
| 5,835,949 | * | 11/1998 | Quattromani et al. | 712/216 |
| 5,867,701 | * | 2/1999 | Brown et al. | 712/248 |

* cited by examiner

Primary Examiner—David Y. Eng
(74) Attorney, Agent, or Firm—Blakely, Sokoloff, Taylor & Zafman LLP

(57) ABSTRACT

An apparatus, system and method are described for tracking in-flight line addresses. Such tracking enables a determination of a self-modifying code (SMC) conflict. In one embodiment, the apparatus comprises a line address buffer and companion logic. The line address buffer contains a first plurality of line addresses. Each line address is associated with a fetched instruction pointer. The comparison logic compares a second plurality of line addresses with an address of an instruction being executed in order to detect an event.

22 Claims, 4 Drawing Sheets

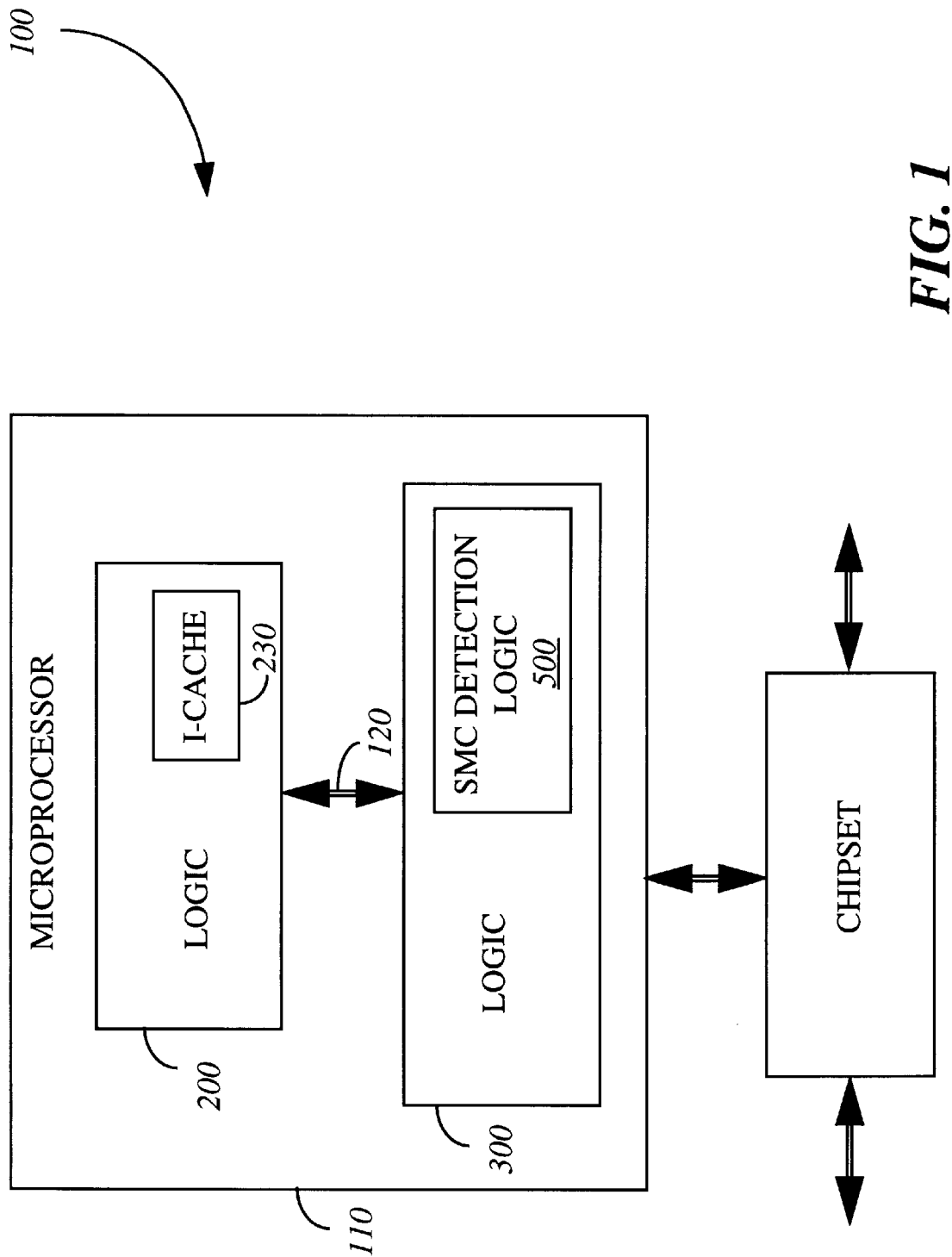

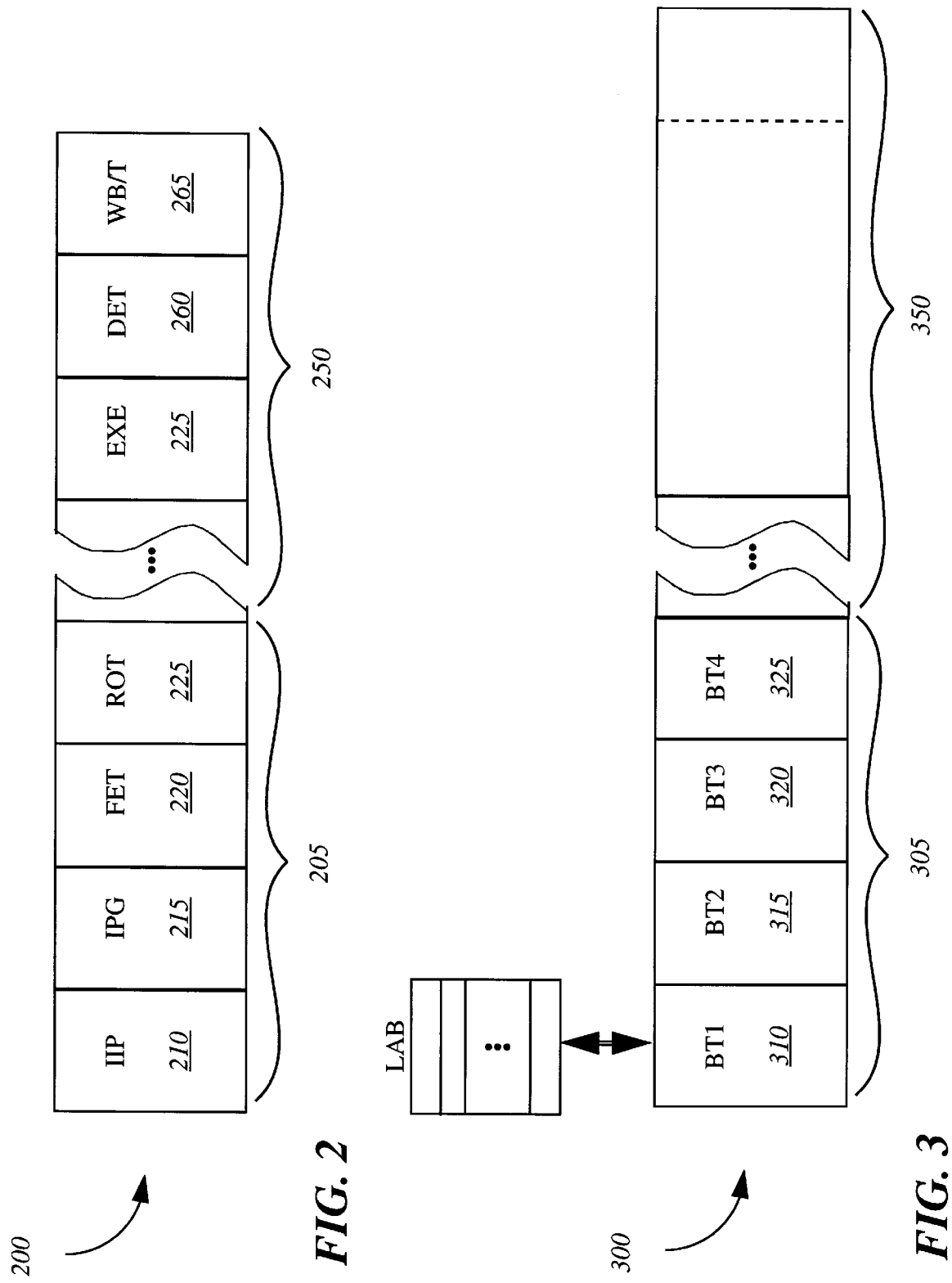

SYSTEM AND METHOD FOR TRACKING IN-FLIGHT INSTRUCTIONS IN A PIPELINE

CROSS-REFERENCES TO RELATED APPLICATIONS

The named inventor of the present application has a co-pending United States patent applications entitled "Apparatus and Method for Detecting and Handling Self-Modifying Code Conflicts in an Instruction Fetch Pipeline" (Application No. 09/088,634 filed Jun. 2, 1998). This application is hereby incorporated by reference in its entirety. This application is owned by the same assignee of the present Application.

BACKGROUND

1. Field

The present invention relates to the field of electronics. More specifically, the invention relates to an apparatus, system and method for tracking in-flight instructions in a pipeline.

2. General Background

Prior generation microprocessors feature circuitry arranged to successively fetch and execute instructions. More specifically, this circuitry fetches instruction pointers (IPs) and places these IPs in an instruction pipeline. The "instruction pipeline" generally includes a plurality of processing stages, wherein the first few processing stages are referred to as a "front-end pipeline" and the remaining processing stages are referred to as a "back-end pipeline". Since IPs are loaded into the front-end pipeline and instructions associated with these IPs are subsequently executed at the back-end pipeline, in-flight IPs are subject to self-modifying code (SMC) conflicts.

A "SMC conflict" is a condition where the execution of an instruction of an executable program causes self-modification of that executable program. This self-modification may lead to the execution of "stale" instruction data already progressing through an instruction pipeline. In particular, a SMC conflict may occur for a number of reasons including, for example, those instances when a new instruction is created or when data embedded into an instruction of a repeatedly executable program is modified. Thus, various SMC handling techniques have been adopted over the years.

For example, earlier generation processors, such as i80486™ and PENTIUM® microprocessors produced by Intel Corporation of Santa Clara, Calif., snooped the instruction pipeline for SMC conflicts. This technique is suitable for pipelines having a small number of processing stages and supporting in-order instruction processing. However, these early generation processors are unable to track out-of-order pipelining of instructions.

Another technique, utilized by the PENTIUM® PRO microprocessor, requires the use of an instruction victim cache (IVC) in combination with a normal instruction cache (I-cache) to guarantee that all of the instructions in the pipeline would be resident in one of these caches. However, this cache architecture requires complicated management logic.

Hence, it would be advantageous to provide a system and method to track in-flight instructions in which the resultant information can be used to detect SMC conflicts for example.

SUMMARY

In one embodiment, for example, the invention comprises a line address buffer and companion logic. The line address buffer contains a first plurality of line addresses. Each line address is associated with a fetched instruction pointer. The comparison logic compares a second plurality of line addresses with a target address of an instruction being executed in order to detect an event.

BRIEF DESCRIPTION OF THE DRAWINGS

The features and advantages of the present invention will become apparent from the following detailed description of an embodiment of the present invention in which:

FIG. 1 is a block diagram of an electronic system implemented with a microprocessor adapted to handle SMC conflicts associated with multiple, parallel pipelines.

FIG. 2 is an illustrative embodiment of front-end and back-end pipelines of an EM pipeline utilized by the microprocessor of FIG. 1.

FIG. 3 is an illustrative embodiment of front-end and back-end pipelines of an IVE pipeline utilized by the microprocessor of FIG. 1.

DESCRIPTION OF AN EMBODIMENT OF THE INVENTION

Figure 4:
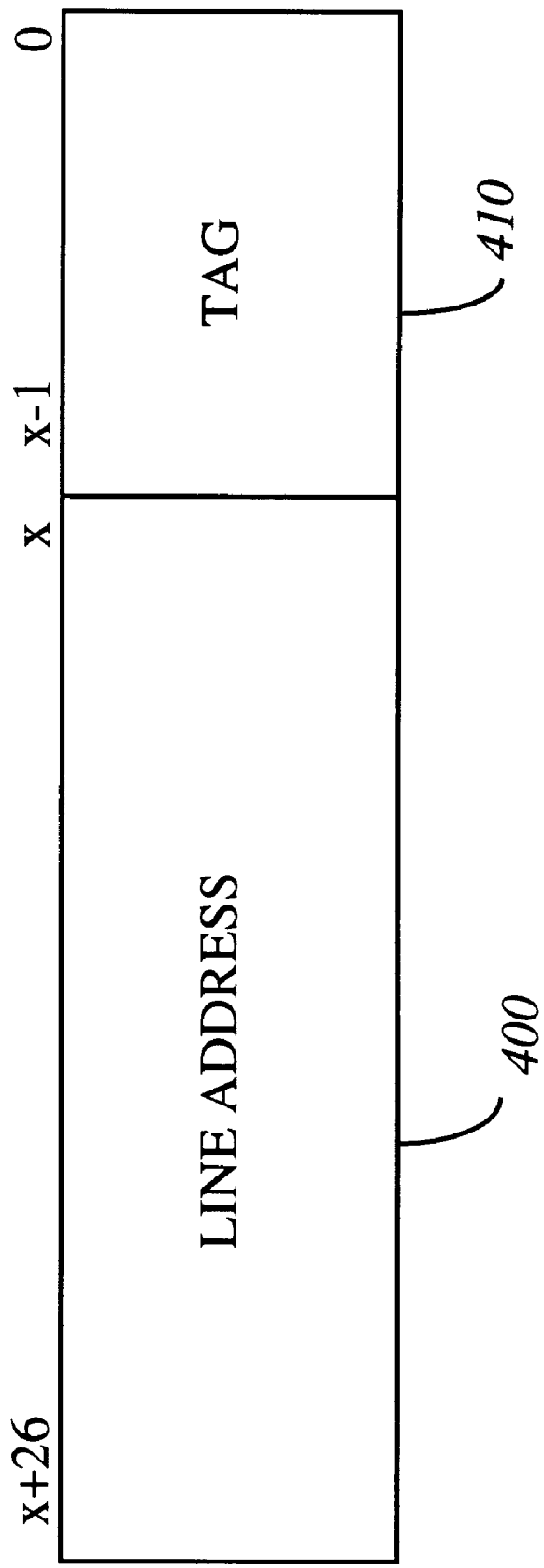
FIG. 4 is an illustrative embodiment of address line and tag instruction progressing through the IVE pipeline of FIG. 3.

Embodiments of a system and method for tracking in-flight instructions through a pipeline are shown. The tracking of in-flight instructions is accomplished by the presence of a line address buffer (LAB) situated to receive line addresses associated with fetched instruction pointers. The LAB may be used to detect self-modifying code (SMC) conflicts as described below. In one embodiment, detection is accomplished by comparing a store address from logic, responsible for instruction execution, with information contained in the LAB.

Herein, a number of terms are frequently used to describe various hardware and functionality. Herein, "information" includes data, validity, address, control or any combination thereof. For example, the information may include an "instruction pointer" (IP) which identifies a line of memory in which an instruction is stored. Normally, an IP includes a $2^X$-bit pointer ("x"$\geq$5). A "line address" is a predetermined number of the most significant bits of the IP to represent a line of memory (e.g., a cache line) within which an instruction associated with the IP is stored. Of course, the line address may be equivalent to the IP in certain system configurations. A "pipeline" features circuitry successively staged to process information in an efficient manner in order to provide greater throughput. The terms "older" and "younger" are used to indicate whether a line address has been inserted into a pipeline before or after another line address, respectively.

With respect to hardware, a "microprocessor" is a single integrated circuit (IC) or multiple ICs having information processing capabilities such as, for example, a general purpose microprocessor, a micro-controller, a state machine, a programmable logic device and the like. "Logic" is a hardware, software used by hardware or a combination thereof. An "electronic system" is broadly defined as any product featuring a microprocessor, such as any type of computer (e.g., desktop, laptop, hand-held, server, mainframe, etc.), a wireless telephone, an imaging device (e.g., digital camera, printer, scanner, etc.) and other products. A "signal line" is broadly defined as any information-carrying medium such as one or more electrical wire(s), bus trace(s), fiber optic(s), wireless communication channel(s), cable, Plain Old Telephone System (POTS) and the like.

Referring to FIG. 1, an illustrative embodiment of an electronic system 100 featuring the present invention is shown. Electronic system 100 includes a microprocessor 110, normally capable of being connected to a chipset. Microprocessor 110 includes logic associated with a first pipeline 200 (e.g., an Enhancement Mode "EM" pipeline), logic associated with a second pipeline 300 (e.g., an INTEL® Value Engine "IVE" pipeline) and SMC detection logic 500 described below. These multiple, parallel pipelines 200 and 300 are coupled together through signal line 120 to concurrently perform various operations.

For example, as shown in FIG. 2, one embodiment of EM pipeline 200 includes a front-end pipeline 205 and a back-end pipeline 250. The front-end EM pipeline 205 is responsible for instruction fetching. The back-end EM pipeline 250 is responsible for, among other things, successive execution of fetched instructions. As shown in FIG. 2, for example, front-end EM pipeline 205 includes an Input Instruction Pointer (IIP) stage 210 to load line addresses for fetched IPs into the EM pipeline. Back-end EM pipeline 250 includes an execution (EXE) stage 255. During EXE stage 255, the target address of an instruction (e.g., store instruction) currently being executed (referred to as the "store address") is transferred to SMC detection logic 500 associated with IVE pipeline 300 as described below.

Referring now to FIG. 3, one embodiment of IVE pipeline 300 includes a front-end IVE pipeline 305 and a back-end IVE pipeline 350. The front-end IVE pipeline 305 includes a plurality of processing stages, which correspond to those stages of front-end EM pipeline 205. These processing stages of front-end IVE pipeline 305 include (i) a first branch target "bt1" stage 310, (ii) a "bt2" stage 315, (iii) a "bt3" stage 320 and (iv) a "bt4" stage 325. During bt1 stage 310, a line address (identical to the one entering front-end EM pipeline 205) is loaded into IVE pipeline 300. Along with the line address, a tag is provided. As shown in FIG. 4, a tag 410 is loaded into IVE pipeline 300 to identify the location of line address 400 within a line address buffer (LAB) 510 of SMC detection logic 500.

In accordance with FIGS. 1–3, when microprocessor 110 is placed in an IVE mode, the validity of information in one pipeline may correspond with the validity of information in the other pipeline. For example, if information progressing through the bt4 stage 325 is invalidated, information associated with the ROT stage 225 in EM pipeline 200 will not be subsequently decoded and utilized. However, when microprocessor 110 is placed in an EM mode, the validity of the contents of IVE pipeline 300 have no effect on the validity of information progressing through EM pipeline 200.

In general, a SMC conflict may occur upon detection of an attempt to dynamically create a new instruction or modify data embedded in an in-flight instruction. Such detection is accomplished through feedback of the store address at the EXE stage and comparison of the store address with the line addresses progressing through IVE pipeline 300 as maintained in LAB 510 as shown in FIG. 5.

Figure 5:
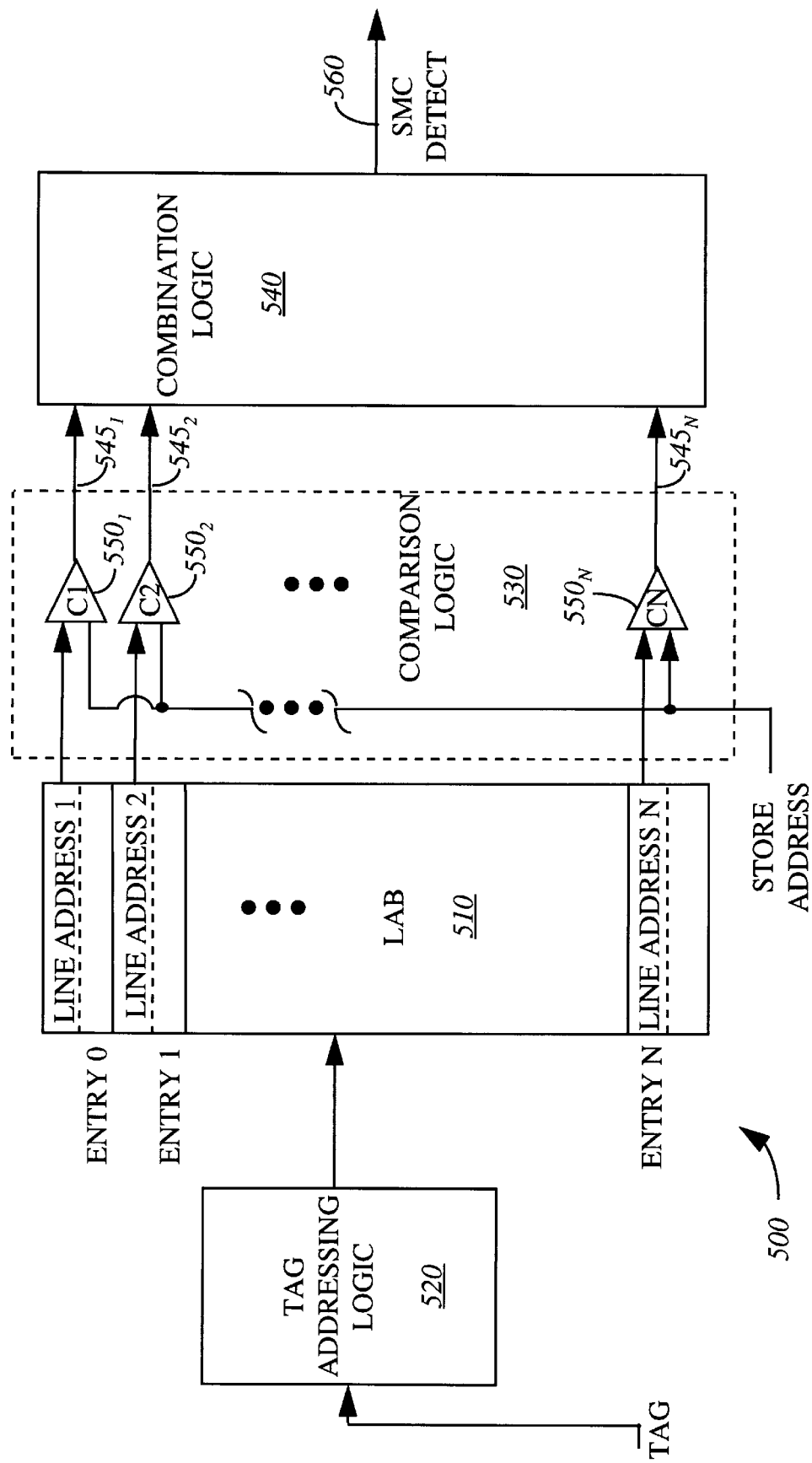
FIG. 5 is an illustrative embodiment of SMC detection logic implemented within the microprocessor of FIG. 1.

Referring now to FIG. 5, an illustrative embodiment of SMC detection logic 500 is shown. As shown in FIG. 5, SMC detection logic 500 comprises LAB 510, tag addressing logic 520, comparison logic 530 and combinatorial logic 540. LAB 510 includes a N-deep buffer ("N" being a positive whole number) in which each entry includes a selected bit width. For example, in this embodiment, a 27-bit width is selected for each entry of LAB 510 which corresponds to a particular size selected for the line addresses. Tag addressing logic 520 ensures that comparison logic 530 performs its functionality only on those entries in LAB 510 considered to be valid. This is accomplished by tag address logic 520 being a pointer to valid entries in LAB 510.

As further shown in FIG. 5, comparison logic 530 compares the contents contained in LAB 510 with the store address provided by the EXE stage of EM pipeline 200 to detect an event, such as a SMC conflict for example. As shown, comparison logic 530 comprises N comparators $550_1$-$550_N$, which compare the line addresses contained in LAB 510 with the store address. The output of each comparator is provided to combinatorial logic 540 which functions as a N-input OR gate. If any matches occur, reflected by a corresponding comparator $550_1$, ..., or $550_N$ activating an input signal line $545_1$, ..., or $545_N$ of combinatorial logic 540, an SMC conflict condition exists. As a result, combinatorial logic 540 activates a SMC DETECT signal line 560 to indicate to logic within a microprocessor, for example, that a SMC conflict has occurred.

It will be evident that various modifications and changes may be made to the present invention without departing from the broader spirit and scope of the invention as set forth in the appended claims. The specification and drawings are, accordingly to be regarded in an illustrative rather than a restrictive sense.

What is claimed is:

1. An apparatus comprising:
   a line address buffer to store at least one line address progressing through a first pipeline having a first plurality of processing stages, the at least one line address being associated with a fetched instruction in a second pipeline having a second plurality of processing stages, the second plurality of processing stages corresponding to the first plurality of processing stages; and
   comparison logic coupled to the line address buffer to compare the at least one line address with a store address of a store instruction being executed in a processing stage from the second plurality of processing stages to detect an event.

2. The apparatus of claim 1, wherein the event is a self-modifying code (SMC) conflict.

3. The apparatus of claim 1, wherein the comparison logic including at least one comparator corresponding to the at least one line address.

4. The apparatus of claim 1 wherein the line address buffer is coupled to the first pipeline to receive the at least one line address.

5. The apparatus of claim 1 further comprising a tag addressing logic, the tag addressing logic controlling the line address buffer to ensure the at least one line address is valid, the tag addressing logic being a pointer to valid entries in the line address buffer.

6. The apparatus of claim 3, wherein the at least one comparator of the comparison logic including a first input uniquely receiving the at least one line address and a second input receiving the store address of the instruction being executed.

7. The apparatus of claim 6 further comprising combinatorial logic coupled to the at least one comparator, the combinatorial logic signaling occurrence of the event if the at least one comparator determining the at least one line address matching the store address of the instruction being executed.

8. A system comprising:
a first pipeline including first circuitry to load at least one line address;
a second pipeline including circuitry to execute a store instruction, the store instruction having a store address, the store address being an address of a content to be modified by the store instruction; and
a detection logic associated with the first and second pipelines, the detection logic comprising:
a line address buffer to store the at least one line address progressing through the first pipeline having a first plurality of processing stages, the at least one line address being associated with a fetched instruction in the second pipeline having a second plurality of processing stages, the second plurality of processing stages corresponding to the first plurality of processing stages, and
comparison logic coupled to the line address buffer to compare the at least one line address with the store address of the store instruction being executed in a stage in the second plurality of processing stages to detect an event.

9. The system of claim 8, wherein the event is a self-modifying code conflict.

10. The system of claim 9, wherein the comparison logic including at least one comparator corresponding to the at least one line address.

11. The system of claim 8, wherein the line address buffer is coupled to the first pipeline in order to receive the at least one line address.

12. The system of claim 8, wherein the circuit further comprises a tag addressing logic, the tag addressing logic controlling the line address buffer to ensure the at least one line address is valid.

13. The system of claim 12, wherein the tag addressing logic is a pointer to plurality of entries.

14. The system of claim 10, wherein the comparison logic includes at least one comparator having a first input uniquely receiving the at least one line address and a second input receiving the store address.

15. The system of claim 14, further comprising combinatorial logic coupled to the at least one comparator, the combinatorial signaling occurrence of the event if the at least one comparator determining the at least one line address matching the store address of the instruction be executed.

16. A method comprising:
storing at least one line address progressing through a first pipeline having a first plurality of processing stages the at least one line address being associated with a fetched instruction in a second pipeline having a second plurality of processing stages corresponding to the first plurality of processing stages; and
comparing the at least one line address to a store address of a store instruction being executed in a processing stage from the second plurality of processing stages to detect an event, the store address being an address of a content to be modified by the store instruction being executed.

17. The method of claim 16, wherein the event is a self-modifying code (SMC) conflict.

18. The method of claim 16, wherein the comparison logic including at least one comparator corresponding to the at least one line address.

19. The method of claim 16 wherein the line address buffer is coupled to the second pipeline in order to receive the at least one line address.

20. The method of claim 16 further comprising controlling the line address buffer by a tag addressing logic, the tag addressing logic ensuring that the at least one line address is valid, the tag addressing logic being a pointer to valid entries in the line buffer.

21. The method of claim 18, wherein the at least one comparator of the comparison logic including a first input uniquely receiving the at least one line address and a second input receiving the store address of the instruction being executed.

22. The method of claim 21 further comprising signaling occurrence of the SMC conflict by a combinatorial logic if the at least one comparator determining a line address matching the store address of the instruction being executed.

* * * * *